United States Patent
Chmiel et al.

(10) Patent No.: US 9,820,293 B2
(45) Date of Patent: Nov. 14, 2017

(54) RATE CAPPING WITH MULTIPLE CARRIER AGGREGATION SCHEDULERS

(71) Applicant: Nokia Solutions and Networks Oy, Espoo (FI)

(72) Inventors: Mieszko Chmiel, Wroclaw (PL); Hans Kroener, Geislingen-Weiler (DE); Robert Buranyi, Budaors (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/426,107

(22) Filed: Feb. 7, 2017

(65) Prior Publication Data

US 2017/0150511 A1 May 25, 2017

Related U.S. Application Data

(63) Continuation of application No. 14/370,264, filed as application No. PCT/EP2012/050020 on Jan. 2, 2012.

(51) Int. Cl.
*H04W 72/12* (2009.01)

(52) U.S. Cl.
CPC ....... *H04W 72/1205* (2013.01); *H04W 72/12* (2013.01)

(58) Field of Classification Search
CPC .......................... H04W 72/12; H04W 72/1205
See application file for complete search history.

(56) References Cited

U.S. PATENT DOCUMENTS

| 2011/0275395 A1 | 11/2011 | Norlund | 455/509 |
| 2012/0044894 A1 | 2/2012 | Ko | 370/329 |

(Continued)

FOREIGN PATENT DOCUMENTS

| WO | WO 2010/123190 A1 | 10/2010 |
| WO | WO 2010/145938 A1 | 12/2010 |

OTHER PUBLICATIONS

3GPP TS 36.306 V10.4.0 (Dec. 2011), "3$^{rd}$ Generation Partnership Project; Technical specification Group radio Access Network; Evolved Universal Terrestrial Radio Access (E-UTRA); User Equipment (UE) radio access capabilities (Release 10)", 21 pgs.

(Continued)

*Primary Examiner* — Edan Orgad
*Assistant Examiner* — Jeremy Costin
(74) *Attorney, Agent, or Firm* — Harrington & Smith

(57) ABSTRACT

In a first aspect, requests for carrier aggregation scheduling for a user equipment are received (S41) from a first cell used for carrier aggregation for the user equipment in a cellular communications network and n second cells of the cellular communications network, used for the carrier aggregation. The requests include a first scheduling decision of the first cell and n second scheduling decisions of the n second cells. It is checked (S42) whether or not the requests exceed limits of the user equipment, and the n second scheduling decisions are modified (S43) according to predefined rules such that the requests do not exceed the limits of the user equipment. In a second aspect, limits of the user equipment are increased by a margin (S51), the increased limits are split onto active cells of the first and n second cells according to a predefined rule (S52), and the margin is controlled (S54) dependent on whether the increased and split limits are exceeded or not by the requests (S53). If they are exceeded, the n second scheduling decisions may be modified according to the first aspect (S43).

19 Claims, 4 Drawing Sheets

(56) References Cited

U.S. PATENT DOCUMENTS

| | | | |
|---|---|---|---|
| 2012/0142361 A1 | 6/2012 | Zhao | 455/446 |
| 2012/0198077 A1 | 8/2012 | Wei | 709/226 |
| 2013/0010743 A1 | 1/2013 | Ahn | 370/329 |

OTHER PUBLICATIONS

Wang, Yuanye, et al., "Carrier Load Balancing and Packet Scheduling for Multi-Carrier Systems", © 2010 IEEE, 10 pgs.

RATE CAPPING WITH MULTIPLE CARRIER AGGREGATION SCHEDULERS

CROSS-REFERENCE TO RELATED APPLICATIONS

This application is a continuation of U.S. patent application Ser. No. 14/370,264, filed on Jul. 2, 2014, which is a 371 of and claims priority to PCT/EP2012/050020, filed on Jan. 2, 2012, the disclosures of which are hereby incorporated by reference in their entirety.

BACKGROUND OF THE INVENTION

Field of the Invention

The present invention relates to carrier aggregation in cellular communication network systems. In particular, the invention relates to rate capping when multiple schedulers perform carrier aggregation, also known as cell aggregation.

Related Background Art

Prior art which is related to this technical field cart e.g. be found in the following references:

[1] 3GPP TS 36.306 vlO. 3.0; and
[2] Yuanye Wang et al.: "Carrier Load Balancing and Packet Scheduling for Multi-Carrier Systems", IEEE, May 2010.

The following meanings for the abbreviations used in this specification apply:
2-D Two-dimensional
3GPP The 3rd Generation Partnership Project
BSR Buffer Status Report
BW Bandwidth
CA Carrier Aggregation
CC Component Carrier
CQI Channel Quality Indicator
DL Downlink
DRB Data Radio Bearer
eNB eNode B
FSY Feasibility Study
GBR Guaranteed Bite Rate
HSPA High-Speed Packet Access
IEEE The Institute of Electrical and Electronics Engineers
LI Layer 1
LTE Long Term Evolution
MAC Medium Access Control
MC Multi Carrier
MCS Modulation and Coding Scheme
NSN Nokia Siemens Networks
OLLA Outer Loop Link Adaptation
PCell Primary Cell
PDCCH Physical Downlink Control Channel
PDCP Packet Data Convergence Protocol
PDSCH Physical Downlink Shared Channel
PDU Protocol Data Unit
PF Proportional Fair
PHY Physical
PRB Physical Resource Block
PUSCH Physical Uplink Shared Channel
QAM Quadrature amplitude modulation
Rel Release
RLC Radio Link Control
SC Single Carrier
SCell Secondary Cell
SCH Shared Channel
SV Scheduling Validator
TB Transport Block
TBS Transport Block Size
TM Transmission Mode
TTI Transmission Time Interval
UE User Equipment
UL Uplink Carrier aggregation allows increasing transmission/reception bandwidth by aggregating component carriers. Prominent benefits of carrier aggregation include increased peak data rates, possibility to aggregate fragmented spectrum and fast load balancing.

In the specification of carrier aggregation in LTE Rel-10 in 3GPP, there is a common scheduler assumed per aggregated cells while MAC entities and PHY layers are separated per cell. However, as shown in reference [2], good performance and inter-user fairness can be achieved with separate per cell schedulers which communicate with each other and coordinate a scheduling metric calculation. This solution with separate and coordinated schedulers has complexity and scalability advantages compared to one common scheduler for all aggregated cells. An eNodeB protocol architecture based on this solution is shown in FIG. 1.

FIG. 1 shows an eNodeB architecture for DL CA with separate coordinated DL-schedulers included in a P-cell and an S-cell of a user equipment in a cellular communications system. PDCP and RLC layers in the P-cell (or S-cell) generate PDCP PDU(s) from radio bearer(s) and RLC PDU(s) from PDCP PDU(s), respectively. MAC layers in the P-cell and the S-cell generate MAC PDU(s) from RLC PDU(s) based on scheduling decisions concerning carrier aggregation, and the generated MAC PDU(s) are forwarded to the PHY layers of the P-cell and the S-cell. The DL-schedulers of the P-cell and the S-cell communicate with each other and with the MAC layers of the P-cell and the S-cell.

In an approach with separate per cell schedulers, since radio resources of each aggregated cell in a given TTI are allocated separately in each cell, based on the same assumptions on UE capabilities and a UE buffer level, the following problem arises.

The total allocated resources might exceed an amount of data in a UE buffer, or some other implementation or operator-specific limit, that can be transmitted in this TTI.

Further, the total allocated resources might exceed the UE capabilities. A maximum number of DL/UL-SCH transport block bits received/transmitted within a TTI (in all TBs) and a maximum number of bits of a DL/UL-SCH transport block received/transmitted within a TTI are specified in reference [1]. For example, UE category 3 is specified as follows:

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 3 | 102048 | 75376 | 1237248 | 2 |

| UE Category | Maximum number of UL-SCH transport block bits transmitted within a TTI | Maximum number of bits of an UL-SCH transport block transmitted within a TT1 | Support for 64 QAM in UL |
|---|---|---|---|
| Category 3 | 51024 | 51024 | No |

In principle, any UE category can support carrier aggregation. As can be seen, even though each cell fulfils the limit of the number of bits per single TB (i.e. maximum number of bits of a DL-SCH transport block received within a TTI), the total number of bits in all TBs can be exceeded because each cell can allocate additional TB(s). For example each cell allocates the TB of 75376 bits, the TB size is within the UE category 3, but the total number of bits in all TBs exceeds the UE category.

In case the total allocated resources exceed the UE category or the data available in the UE buffer, there will be an error and/or throughput loss and/or unnecessary padding.

This problem is overcome by the prior art solution in the following way. A scheduling metric is calculated by the separate DL-schedulers per cell considering MC and SC UEs, the DL-schedulers coordinate with each other to ensure fairness across MC and SC UEs. Based on separately calculated scheduling metrics one common priority list is constructed, e.g. MC UEs can be included multiple times in the list, for the purpose of resource allocation. If due to scheduling on multiple cells a MC UE reaches its rate limit, e.g. due to limited data in the buffer, another UE from the list can be scheduled and loss/error, e.g. due to a MC UE being allocated too much resources, is avoided.

However, this solution is not applicable to a two-dimensional time-frequency scheduling, i.e. the frequency domain scheduling cannot be done multiple times due eNB processing time constraints. The UEs that were not allocated frequency domain resources cannot be scheduled again if for some reason some resources are freed after frequency domain scheduling, e.g. due to PDCCH blocking.

SUMMARY OF THE INVENTION

The present invention aims at overcoming the above-described problem of rate capping with multiple two-dimensional schedulers of aggregated cells.

This is achieved by the methods and apparatuses as defined in the appended claims. The invention may also be implemented by a computer program product.

According to an embodiment of a first aspect of the invention, in case resources allocated to a UE exceed a limit/amount of data that can be transmitted/received by the UE, the excess is detected after (time and frequency domain) scheduling, a signaled allocation is corrected in a predefined cell(s) by first reducing MCS, second, if needed, reducing the number of allocated PRBs, e.g. even up to cancellation of the whole UE's allocation on the cell, until the amount of transmitted/received data is below the limit.

According to an embodiment of a complementary/alternative second aspect of the invention, the limit/amount of data that can be transmitted/received by the UE is split onto active cells. The split is semi-static according to a predefined rule. In case this aspect is complementary, the split can use an overbooking scheme with some margin compared to the limit/amount of data that can be transmitted/received by the UE. In case the increased and split limit is exceeded, the scheme falls back to the above aspect where the excess is detected and corrected. Furthermore, the margin of overbooking can be controlled by monitoring if the fallback solution is used or not.

In the following the invention will be described by way of embodiments thereof with reference to the accompanying drawings.

DESCRIPTION OF THE EMBODIMENTS

Figure 1:
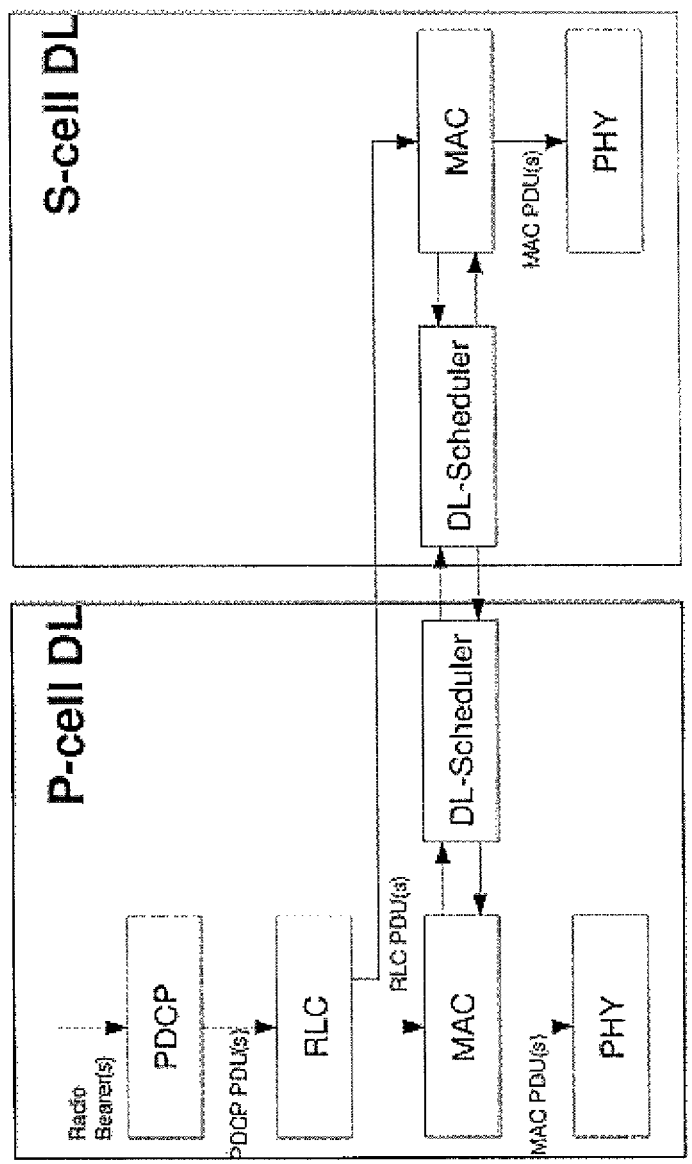
FIG. 1 shows a schematic block diagram illustrating an eNB architecture for DL CA with separate coordinated schedulers.
Figure 2:
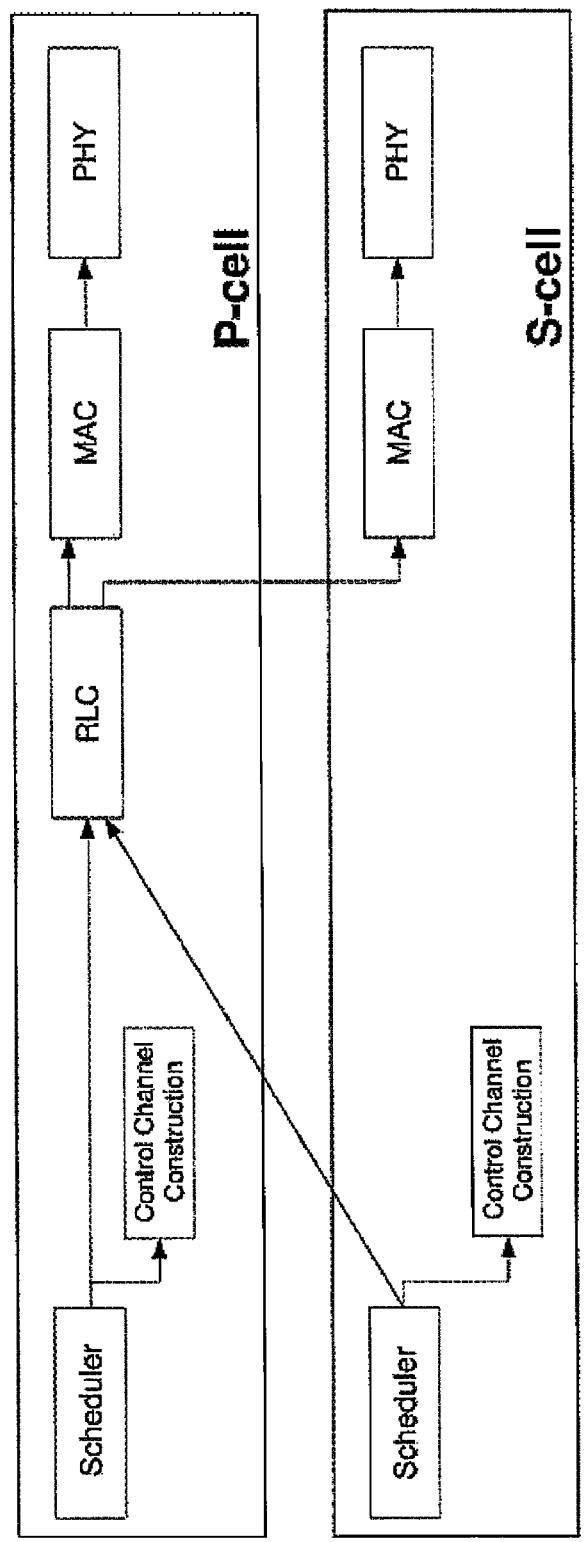
FIG. 2 shows a schematic diagram illustrating a sequence of eNB processing for CA scheduling.
Figure 3:
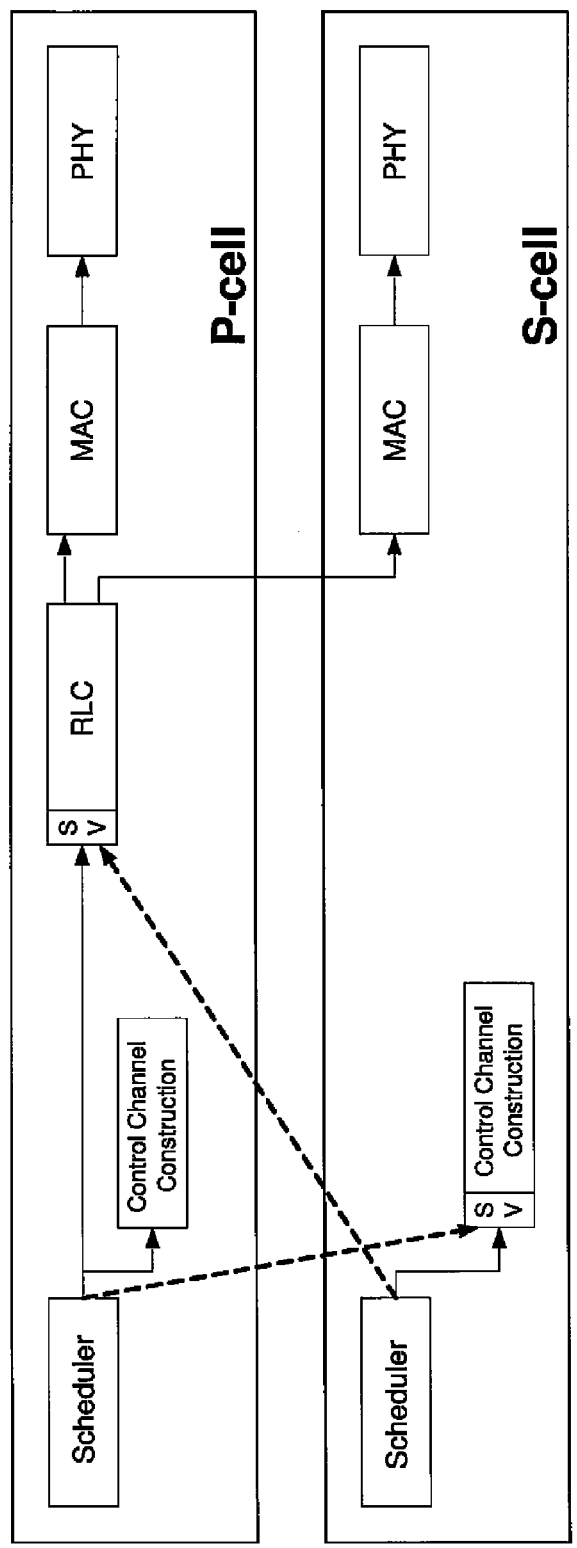
FIG. 3 shows a schematic diagram illustrating a sequence of eNB processing for CA scheduling according to an embodiment of the first aspect of the invention.

In the following, an implementation example of the invention will be described based on FIG. 2 showing a sequence of general eNodeB processing during scheduling for CA with per cell schedulers, and FIG. 3 showing a sequence of eNodeB processing for CA scheduling with per cell schedulers according to an embodiment of the first aspect of the invention.

As shown in FIG. 2, an RLC entity of a P-cell (the location of the RLC entity is an example, it may be e.g. in S-cell alternatively) of a user equipment in a cellular communications network generates RLC PDU(s) in accordance with CA scheduling decisions of a scheduler of the P-cell and a scheduler of an S-cell of the user equipment, which are forwarded to MAC entities and PHY layers of the P-cell and the S-cell. Moreover, based on the scheduling decisions control channel construction is carried out in the P-cell and the S-cell. It is to be noted that control channel construction before RLC processing is an example and it may be carried out e.g. after MAC processing.

With this approach, however, limitations (limits) of the user equipment may be exceeded as described above.

In FIG. 3, a block "SV" is added compared to FIG. 2, which detects limit excesses and can modify a signaled allocation along with a corresponding number of transmitted/received bits/PRBs, which will be described in more detail below. Again it is to be noted that control channel construction before RLC processing is an example and it may e.g. be carried out after MAC processing.

Referring to FIG. 3, the SV combines scheduling decisions for each CA UE and checks if an aggregated scheduling decision over all cells still fulfills UE limitations or not. In case of any conflict, the Logic entity SV reacts and corrects the scheduling on one or more cells. The SV is working on UE basis. FIG. 3 shows a logical processing sequence of the U E scheduling, starting from scheduling till PHY processing. Dashed arrows from P-cell's scheduler to S-cell's control channel (PDCCH) construction and from S-cell's scheduler to the RLC entity are related to carrier aggregation functionality. The SV works before the SCell's control channel construction and before the RLC entity. It is noted that there is no need for an SV on the P-cell's (or on one other cell's) control channel construction (first PDCCH construction), as explained below.

Assuming that both schedulers are working independently, and only the SV is responsible for the UE limits not to be exceeded when scheduled, both (multiple for more than 2 cells) SVs perform the same countermeasures if the limits are exceeded.

Alternatively, there may be one SV per UE which communicates its decisions to other involved entities. That is, alignment between PDCCH and RLC allocations could be also achieved by doing the SV in one of those and informing the other. However, with this approach additional time criticalities are involved in processing.

The SV on the RLC entity receives requests including scheduling decisions for the same UE from the PCell and from the SCell. It checks if the UE limits are exceeded by the requests, and if yes, it modifies/cancels some of the scheduling decisions. The same processing is performed by the SV at the S-cell's control channel construction. This is the point where the UE's downlink assignment/uplink grant is constructed for PDCCH signaling. Each cell's scheduling decision separately does not violate the UE limits, if only this one cell will schedule the UE within this TTI (that is, none of the schedulers assigns an assignment/grant to the UE which is above it capabilities).

As there is one scheduling decision which is always correct (if it were alone), the scheduling decisions of each carrier (cell) may be ordered. An order relying on reception time of the scheduling decision at the SV is not feasible, since the order of the scheduling requests received by the RLC & PDCCH entities is not guaranteed to be the same. The scheduling decisions may be ordered by logical cell index: P-cell is checked first, S-cell(I) is checked second, and so on. Alternatively, some other rule can be used for ordering scheduling decisions from different cells e.g. according to TBS/MCS/#PRBs of the allocation (and cell index for tie-break situations).

In a preferred embodiment, as the P-cell is checked first and the first scheduling decision is always a valid one and not modified, the P-cell control channel construction does not need to have an SV entity for this UE. Note that for other UEs where this cell is possibly an S-cell, the SV must be active. The SV at the S-cell's control channel construction collects the scheduling decisions from the P-cell and from the first S-cell for this UE, within the same TTI. Once the P-cell and the S-cell scheduling decisions are both available, the SV may decide to modify the S-cell scheduling decision by selecting a lower MCS and/or by reducing the number of PRBS, or by completely cancelling S-cell scheduling if lowering the MCS/#PRBs would still yield to an exceeding TB size. For the RLC's SV, the same algorithm must be applied as for the SV related to the S-cell's channel control (PDCCH) scheduler: the $n^{th}$ scheduler's decision may be processed (and by demand changed) only if the n-I$^{th}$ scheduling decision was already processed.

According to the preferred embodiment, the SV is present at entities constructing PDCCH (as described above) and at entities responsible for DL/UL PHY/MAC/RLC processing. According to an alternative embodiment, only one SV is used and the decision is communicated to other relevant entities.

The implementation example shown in FIG. 3 is described based on "normal" CA operation, i.e. the PDCCH and a corresponding PDSCH are sent on the same cell and a PUSCH is sent on a corresponding SIB2 linked UL cell. However, the invention is equally applicable to "cross-CC" (aka cross-CC scheduling) CA operation where the PDCCH can be sent on a different cell than the corresponding PDSCH/PUSCH. It this case, the implementation can be simplified: in case PDCCH processing corresponding to multiple cells (i.e. two or more cells) is collocated, an additional SV at the control channel construction is not needed. For example, two cells cross-scheduled from one cell need only one SV for the collocated PDCCH construction.

The above implementation example is described with focus on two cells; however, the invention is equally applicable to more than two cells with the same interactions/algorithms between the relevant entities.

Moreover, the S-cell may be activated or deactivated based on required needs.

Figure 4:
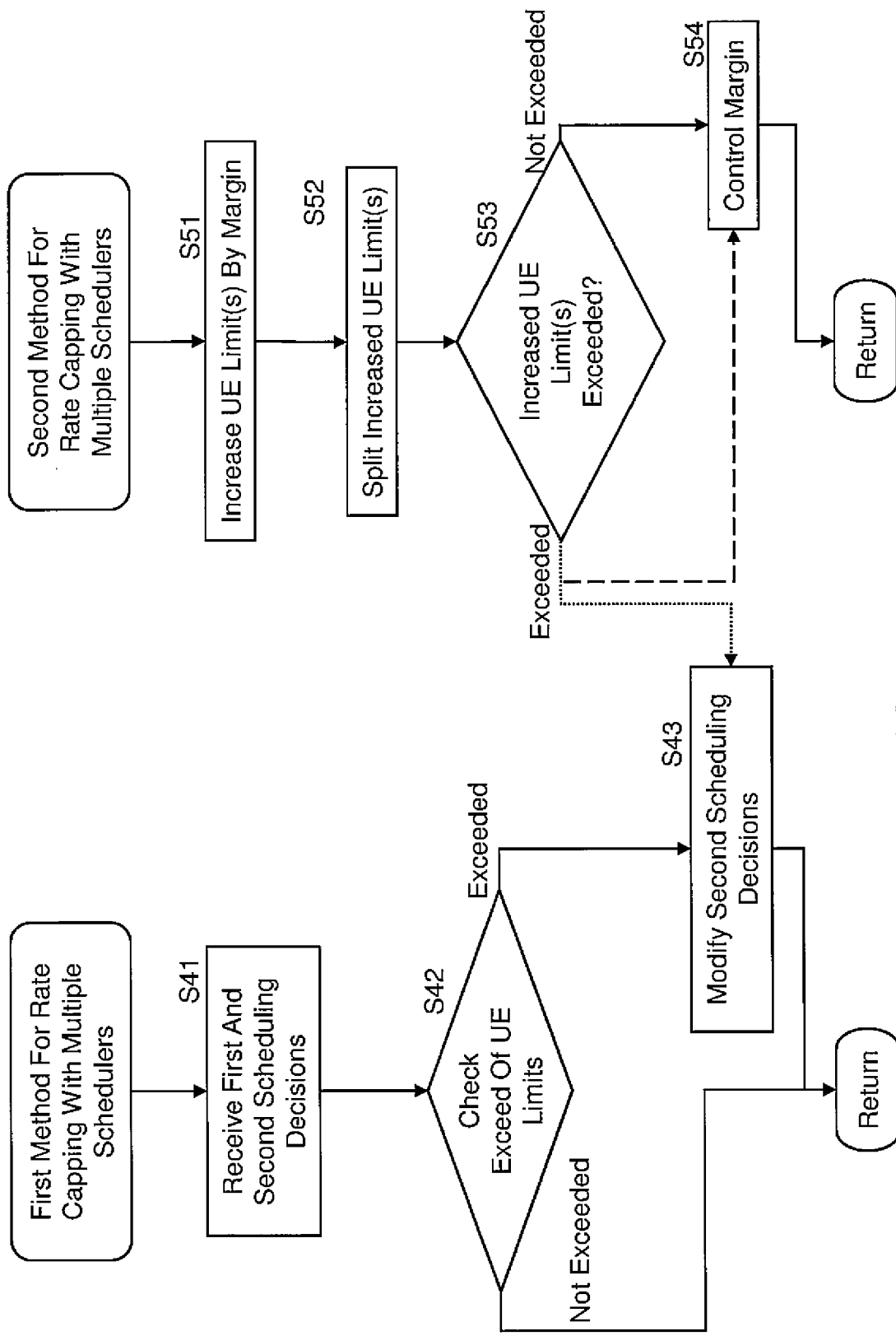
FIG. 4 shows flow charts illustrating procedures according to the first and second aspects of the invention.

Referring to FIG. 4, on the left side of FIG. 4 a flowchart is shown which illustrates processing steps of a method according to the first aspect of the invention. The method may be executed by the SV(s) described above.

In step S41, requests for carrier aggregation scheduling for a user equipment are received. The requests are received from a first cell and n second cells in a cellular communications network, which are used for carrier aggregation for the user equipment, n is an integer equal to or greater than one. The requests include a first scheduling decision of the first cell and n second scheduling decisions of the n second cells.

In step S42, it is checked whether or not the requests exceed limits of the user equipment. In case the limits are exceeded, in step S43, the n second scheduling decisions are modified according to predefined rules such that the requests do not exceed the limits of the user equipment. In case the limits are not exceeded, the process returns.

The above steps may be carried out by processing resources, memory resources and interfaces of a base station, e.g. an eNodeB.

The first and n second cells may be determined based on a cell index. For example, the first cell is a P-cell of the user equipment and the n second cells are S-cells of the user equipment like in the implementation example shown in FIG. 3.

Alternatively or in addition, the first and n second cells may be determined based on allocation decisions, e.g. TBS/MCS/#PRBs of the allocation.

When modifying the n second scheduling decisions, an n-th second scheduling decision is processed if an (n–I)-th second scheduling decision has been processed, according to the predefined rules such that the requests do not exceed the limits of the user equipment.

The above method may be implemented in an entity (first entity) of a base station, e.g. an eNodeB, which performs uplink/downlink processing for the user equipment, e.g. UL/DL PHY/MAC/RLC processing, and in an entity (second entity) of the base station which constructs a physical downlink control channel for the user equipment.

Alternatively, the method may be implemented in the first entity or in the second entity, wherein when the method is implemented in the first/second entity, the first/second entity informs the second/first entity about the modified n second scheduling decisions.

As mentioned above, the limits of the UE may be represented by an amount of data which can be transmitted/received by the UE, wherein when modifying the n second scheduling decisions, a modulation and coding scheme set in the n second scheduling decisions is reduced until the amount of transmitted/received data is below the limits. Additionally, a number of allocated physical resource blocks in the n second scheduling decisions may be reduced, until the amount of data transmitted/received is below the limits.

The method may be implemented for each user equipment, and the first and n second scheduling decisions may include time and frequency domain scheduling.

The second aspect of the invention can be complementary in two ways. According to a first approach, for some UE rate limit(s) the solution according to the first aspect of the invention is adopted, and for some other UE rate limit(s) the solution according to the second aspect is adopted.

According to a second approach, the UE limits are increased with some margin and the increased limits are split among cells used for carrier aggregation. Regarding control of the margin, the over-allocation may be increased by a certain value when the UE limits were not exceeded and reduced by another value when the UE limits were exceeded and the first aspect of the invention is applied as a fallback solution. As a result, a certain probability of overbooking can be obtained.

Referring to FIG. 4, on the right side of FIG. 4 a flowchart is shown which illustrates processing steps of a method according to the second aspect of the invention.

In step S51, limit(s) of a user equipment are increased by a margin. In step S52, the increased limit(s) are split onto active cells of a first and n second cells used for carrier aggregation for the user equipment in a cellular communications network according to a predefined rule, n being an integer equal to or greater than one. In case the increased and split limit(s) are not exceeded by requests for scheduling for the user equipment from the first cell and n second cells in step S53, the margin is controlled in step S54.

The above steps may be carried out by processing resources, memory resources and interfaces of a base station, e.g. an eNodeB.

In case the increased and split limit(s) is/are exceeded in step S53, the process may proceed to step S43 of the method of the first aspect as indicated by the dotted line. It is also possible to control the margin in case the UE limit(s) is/are exceeded, as indicated by the dashed line from step S53 to step S54.

In step S54, the margin may be monitored and controlled such that the a certain probability of excess is obtained. In particular, this margin of overbooking may be controlled by monitoring if the fallback solution (method of first aspect) is used or not.

The split can take into account UE radio conditions on cells, load on cells and also bandwidths and transmission modes of the cells if the bandwidths and transmission modes are not the same on the aggregated cells. Preferably, a ratio of the split is semi-static, i.e. can be changed less often than every TTI. Alternatively, the ratio may be dynamic (i.e. can be changed every TTI) or static.

An advantage of the second aspect is that no PRB is wasted compared to the first approach where unused or not optimally used PRB(s) may be present in some TTIs, and there is no need to coordinated PDCCH (control channel) construction in P-cell and S-cell(s).

However, according to the second aspect, a peak data rate on each cell may be restricted, and the amount of data that can be scheduled on each cell e.g. up to a deadlock where all data can be scheduled on one cell but is not due to the split and scheduling on a single cell may be restricted. Moreover, the split may be inaccurate due to unpredictable load variations. In addition, the second aspect relies on accurate and swift S-cell activation/deactivation decisions.

According to the first aspect of the invention, various UE rate limits can be fulfilled with aggregation of cells supported by individual (coordinated) schedulers. Throughput loss and an error due to scheduling more resources than the UE can transmit/receive are mitigated. The solution according to the first aspect is applicable to DL/UL, to CA of two or more cells and to "normal" and "cross-CC" CA operation. Moreover, the solution does not require very accurate/swift S-cell activation/deactivation decisions.

According to an aspect of the invention, an apparatus is provided which comprises means for receiving requests for carrier aggregation scheduling for a user equipment from a first cell used for carrier aggregation for the user equipment in a cellular communications network and n second cells of the cellular communications network, used for the carrier aggregation, n being an integer equal to or greater than one, the requests including a first scheduling decision of the first cell and n second scheduling decisions of the n second cells, means for checking whether or not the requests exceed limits of the user equipment, and means for modifying the n second scheduling decisions according to predefined rules such that the requests do not exceed the limits of the user equipment.

The first and n second cells may be determined based on a cell index, and/or the first and n second cells may be determined based on allocation decisions. The means for modifying may comprise means for processing an n-th second scheduling decision if an (n−I)-th second scheduling decision has been processed, according to the predefined rules such that the requests do not exceed the limits of the user equipment.

The apparatus may comprise a first entity of a base station, which performs uplink/downlink processing for the user equipment, and/or a second entity of the base station which constructs a physical downlink control channel for the user equipment.

The apparatus may comprise means for sending the modified n second scheduling decisions to the first/second entity, or may comprise means for receiving the modified n second scheduling decisions from the first/second entity.

The limits may be represented by an amount of data which can be transmitted/received by the user equipment, and the means for modifying may comprise means for reducing a modulation and coding scheme set in the n second scheduling decisions until the amount of transmitted/received data is below the limits.

The means for modifying may further comprise means for reducing a number of allocated physical resource blocks in the n second scheduling decisions, until the amount of transmitted/received data is below the limits.

The above means may be implemented for each user equipment.

The first and n second scheduling decisions may include time and frequency domain scheduling.

According to a second aspect of the invention, an apparatus is provided which comprises means for increasing limits of a user equipment by a margin, means for splitting the increased limits onto active cells of a first and n second cells used for carrier aggregation for the user equipment in a cellular communications network according to a predefined rule, n being an integer equal to or greater than one, and means for controlling the margin dependent on whether the increased and split limits are exceeded or not by requests for scheduling for the user equipment from the first cell and n second cells.

The apparatus may comprise means for checking whether the limits are exceeded by the requests, and means for, if they are exceeded, modifying the n second scheduling decisions according to predefined rules such that the requests do not exceed the limits of the user equipment according to the first aspect.

The apparatus may also comprise means for monitoring and controlling the margin such that a certain probability of limit excess is obtained.

In a first aspect, requests for carrier aggregation scheduling for a user equipment are received from a first cell used for carrier aggregation for the user equipment in a cellular communications network and n second cells of the cellular communications network, used for the carrier aggregation. The requests include, a first scheduling decision of the first cell and n second scheduling decisions of the n second cells. It is checked whether or not the requests exceed limits of the user equipment, and the n second scheduling decisions are modified according to predefined rules such that the requests do not exceed the limits of the user equipment. In a second aspect, limits of the user equipment are increased by a margin, the increased limits are split onto active cells of the first and n second cells according to a predefined rule, and the margin is controlled dependent on whether the increased and split limits are exceeded or not by the requests. If they are exceeded, the n second scheduling decisions may be modified according to the first aspect.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
splitting, by an apparatus, a limit of a user equipment onto multiple active cells, the multiple active cells being a first cell and n second cells used for carrier aggregation for the user equipment in a cellular communications network, n being an integer equal to or greater than one, wherein the limit corresponds to a total amount of data transmitted to the user equipment using the carrier aggregation over the multiple active cells, and the splitting splits the total amount of data into an amount of data for each of the multiple active cells; and
controlling, by the apparatus, the amount of data transmitted by each of the multiple cells to the user equipment using the carrier aggregation in order to not exceed the limit of the user equipment at least by performing either decreasing or increasing a ratio of the split for each active cell in response to conditions on each of the active cells used for the carrier aggregation for the user equipment.

2. The method of claim 1, wherein the apparatus comprises a base station, which performs uplink or downlink processing for the user equipment.

3. The method of claim 2, wherein the base station is a first one of multiple base stations in the active cells, one base station per active cell, and the first base station informs other base stations in the active cells of the decrease or increase in the ratio that corresponds to the active cell.

4. The method of claim 1, wherein the apparatus comprises a base station, which constructs a physical downlink control channel for the user equipment.

5. The method of claim 4, wherein the base station is a first one of multiple base stations in the active cells, one base station per active cell, and the first base station informs other base stations in the active cells of the decrease or increase in the ratio that corresponds to the active cell.

6. The method of claim 1, wherein controlling the amount of data transmitted by each of the multiple cells to the user equipment using the carrier aggregation further comprises reducing a modulation and coding scheme set in scheduling decisions for the n second cells in the active cells until the amount of data transmitted to the user equipment is below the limit.

7. The method of claim 1, wherein controlling the amount of data transmitted by each of the multiple cells to the user equipment using the carrier aggregation further comprises reducing a number of allocated physical resource blocks used for scheduling the n second cells, until the amount of data transmitted to the user equipment is below the limit.

8. The method of claim 1, wherein the method is implemented for each user equipment.

9. The method of claim 1, wherein controlling the amount of data transmitted by each of the multiple cells to the user equipment using the carrier aggregation further comprises adjusting scheduling decisions for the first cell and the n second cells, and the scheduling decisions include time and frequency domain scheduling.

10. An apparatus comprising:
one or more non-transitory memory resources comprising software code portions; and
one or more hardware processors,
the one or more non-transitory memory resources and the software code portions configured, with the one or more hardware processors, to cause the apparatus to perform at least the following:
splitting, by the apparatus, a limit of a user equipment onto multiple active cells, the multiple active cells being a first cell and n second cells used for carrier aggregation for the user equipment in a cellular communications network, n being an integer equal to or greater than one, wherein the limit corresponds to an amount of data transmitted to the user equipment over the multiple active cells, and the splitting splits the total amount of data into an amount of data for each of the multiple active cells; and
controlling, by the apparatus, the amount of data transmitted by each of the multiple cells to the user equipment using the carrier aggregation in order to not exceed the limit of the user equipment at least by performing either decreasing or increasing a ratio of the split for each active cell in response to conditions on each of the active cells used for the carrier aggregation for the user equipment.

11. The apparatus of claim 10, wherein the apparatus comprises a base station, which performs uplink or downlink processing for the user equipment.

12. The apparatus of claim 11, wherein the base station is a first one of multiple base stations in the active cells, one base station per active cell, and the first base station informs other base stations in the active cells of the decrease or increase in the ratio that corresponds to the active cell.

13. The apparatus of claim 10, wherein the apparatus comprises a base station, which constructs a physical downlink control channel for the user equipment.

14. The apparatus of claim 13, wherein the base station is a first one of multiple base stations in the active cells, one base station per active cell, and the first base station informs other base stations in the active cells of the decrease or increase in the ratio that corresponds to the active cell.

15. The apparatus of claim 10, wherein controlling the amount of data transmitted by each of the multiple cells to the user equipment using the carrier aggregation further comprises reducing a modulation and coding scheme set in scheduling decisions for the n second cells in the active cells until the amount of data transmitted or received by the user equipment is below the limit.

16. The apparatus of claim 10, wherein controlling the amount of data transmitted by each of the multiple cells to the user equipment using the carrier aggregation further comprises reducing a number of allocated physical resource blocks used for scheduling the n second cells, until the amount of data transmitted or received by the user equipment is below the limit.

17. The apparatus of claim 10, wherein the splitting and controlling are implemented for each user equipment.

18. The apparatus of claim 10, wherein controlling the amount of data transmitted by each of the multiple cells to the user equipment using the carrier aggregation further comprises adjusting scheduling decisions for the first cell and the n second cells, and the scheduling decisions include time and frequency domain scheduling.

19. A computer program product comprising a non-transitory computer-readable medium including a program for a processing device, the program comprising software code portions for performing, when the program is run on the processing device, operations comprising:
splitting, by an apparatus, a limit of a user equipment onto multiple active cells, the multiple active cells being a first cell and n second cells used for carrier aggregation for the user equipment in a cellular communications network, n being an integer equal to or greater than one, wherein the limit corresponds to a total amount of data transmitted to the user equipment using the carrier aggregation over the multiple active cells, and the splitting splits the total amount of data into an amount of data for each of the multiple active cells; and
controlling, by the apparatus, the amount of data transmitted by each of the multiple cells to the user equipment using the carrier aggregation in order to not exceed the limit of the user equipment at least by performing either decreasing or increasing a ratio of the split for each active cell in response to conditions on each of the active cells used for the carrier aggregation for the user equipment.

* * * * *